J. M. G. MOUCK.
Modes of Connecting Pitmen to Fly-Wheels.
No. 151,310. Patented May 26, 1874.
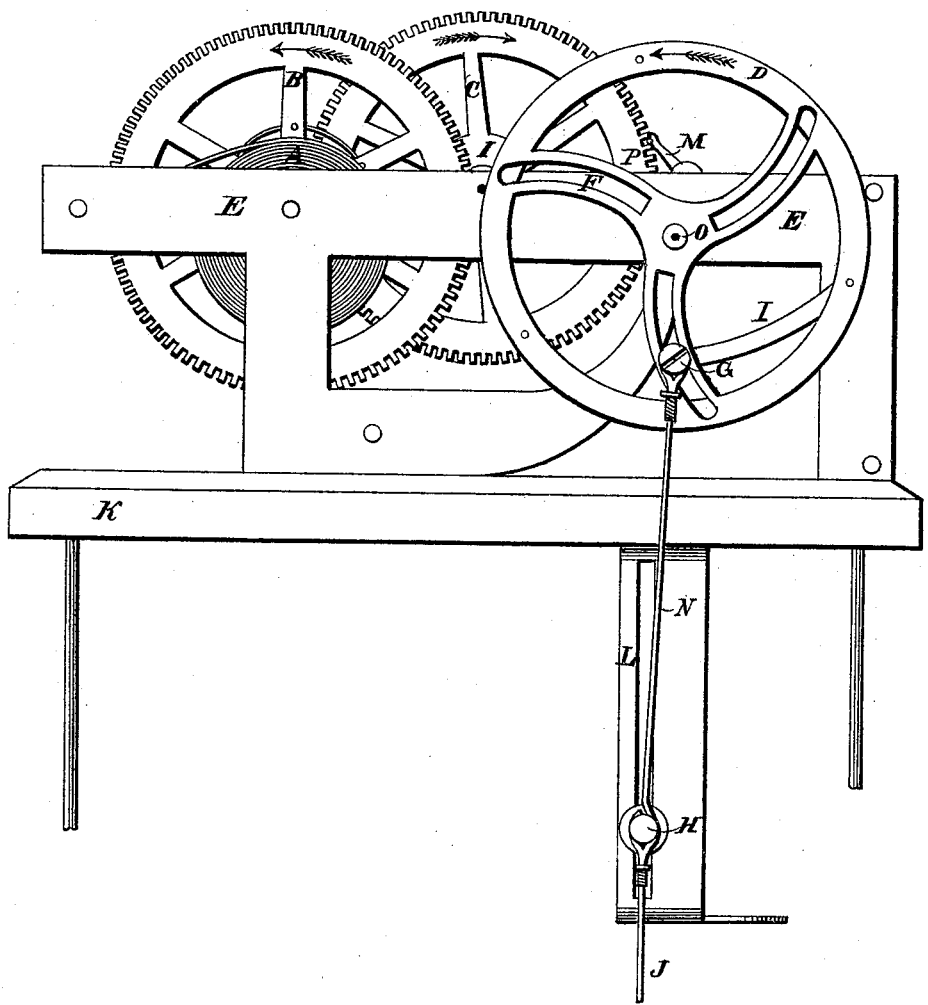
Witnesses.
Wm. C. Samson
Bartn A. Fletcher
Inventor.
James. M. G. Mouck.

UNITED STATES PATENT OFFICE.

JAMES M. G. MOUCK, OF DRAKEVILLE, IOWA.

IMPROVEMENT IN THE MODES OF CONNECTING PITMEN TO FLY-WHEELS.

Specification forming part of Letters Patent No. 151,310, dated May 26, 1874; application filed August 19, 1873.

*To all whom it may concern:*

Be it known that I, J. M. G. MOUCK, of Drakeville, in the county of Davis and the State of Iowa, have invented a new Improvement in Mode of Attaching Pitmen to Fly-Wheels; and I do declare the following to be a full, clear, and exact description of the same, reference being had to the accompanying drawing forming a part of this specification, in which is represented a side view of my improved wheel, arranged in connection with an ordinary spring-power mechanism, A B C I O.

The wheel has curved arms F, one of which is provided with a slot. This construction adapts it for attachment of a pitman, J, by means of a wrist-pin, S, which passes through the end of a bar that is pivoted to the rim of the wheel, and is clamped in any adjustment by a screw-nut.

To allow the pin G to be adjusted for giving a longer or shorter stroke of the pitman, it is evident the slot must be upon a curve of a circle whose radius is the pivot of bar I.

It is a well-known fact that the arms of a fly or balance wheel require to be as light, and its rim as heavy, as possible. The curved slot in one of the arms of the wheel D naturally weakens it, and one of the objects of the bar I is to compensate for the loss and prevent breaking or giving way of the arm. Another and more important result is, overbalancing the wheel on one side, so that it has no dead-center, which, of course, saves power.

I have shown the pitman as provided with a wrist-pin, H, working in a vertical slot of bar L, which depends from the frame E.

The pitman may be connected with any mechanism drivin by any moter used to impart rotation to the fly-wheel, and, of course, the guide-bar L may be dispensed with if desirable.

Having thus described my invention, what I claim is—

The combination, with the fly-wheel D having a curved slotted arm, F, of the bar I, pivoted to the rim thereof, the wrist-pin G, and pitman, all as shown and described.

JAMES M. G. MOUCK.

Witnesses:
WM. C. SAMSON,
BARTON A. FLETCHER.